(No Model.) 9 Sheets—Sheet 1.
E. F. GRANDY.
LASTING MACHINE.
No. 552,834. Patented Jan. 7, 1896.
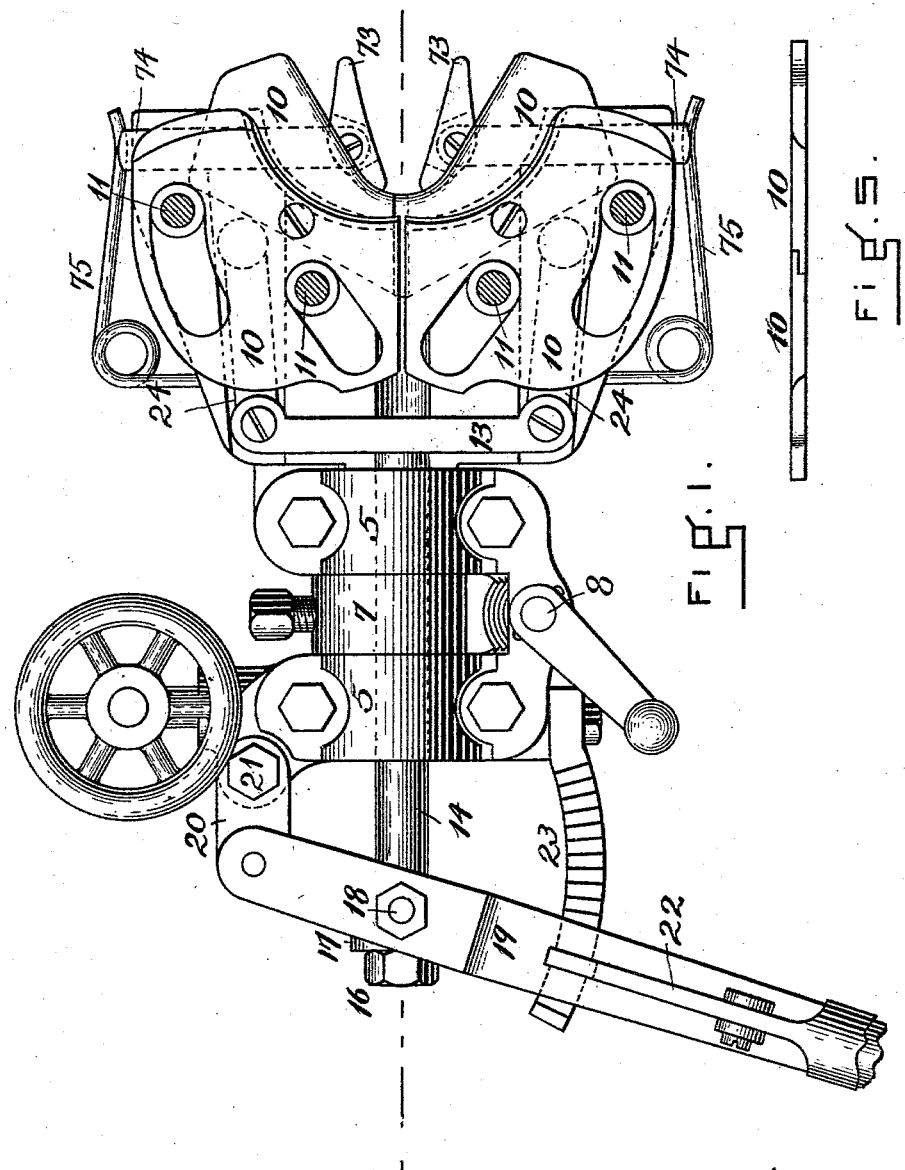
WITNESSES
Frank G. Parker
Edward S. Day
INVENTOR
Edward F. Grandy

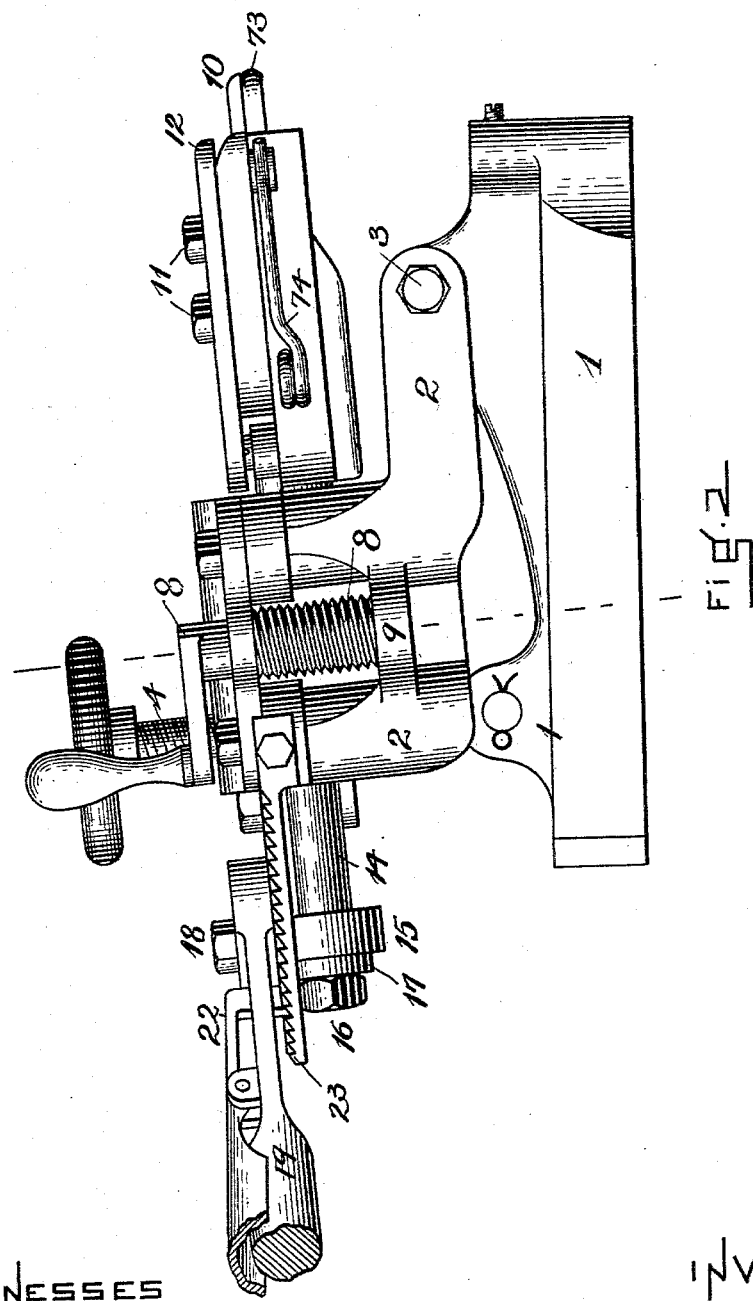

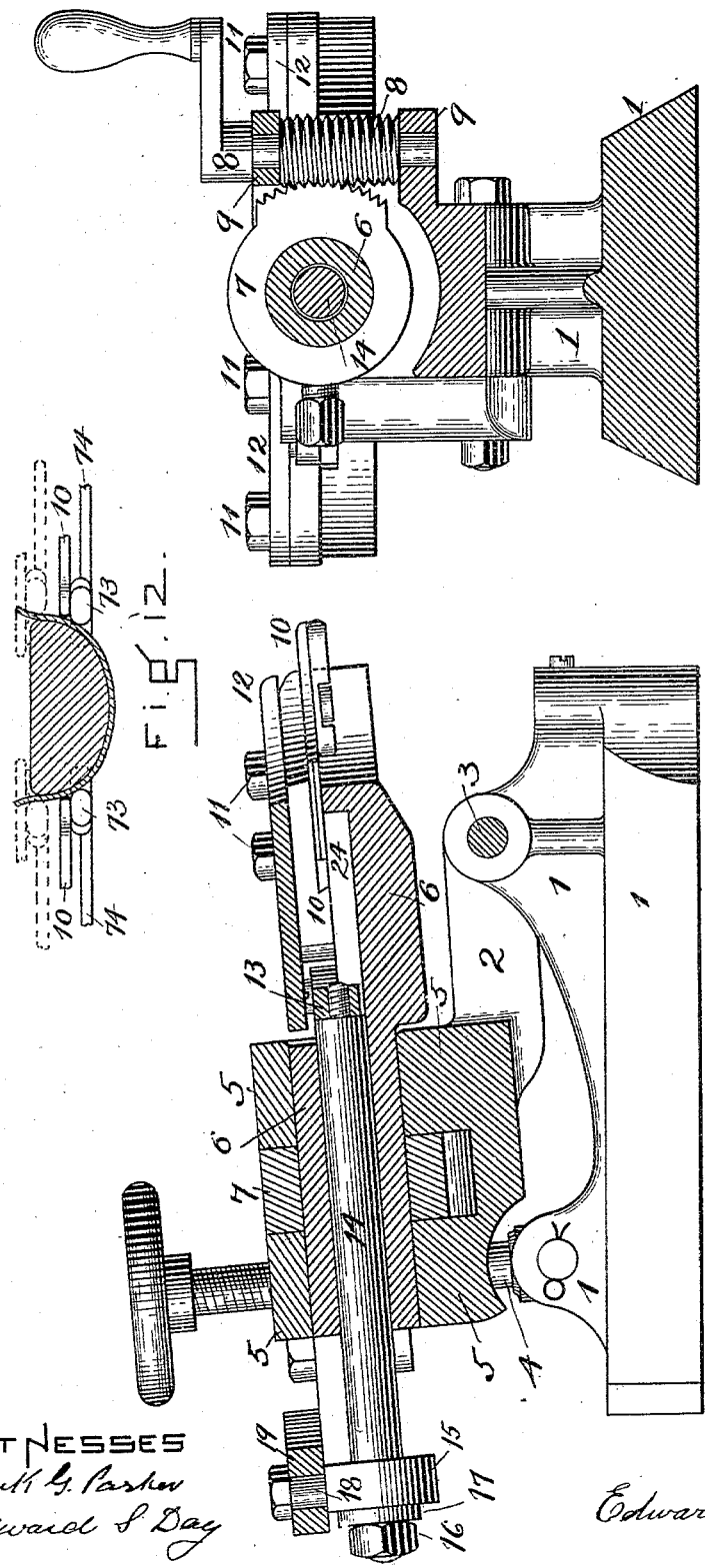

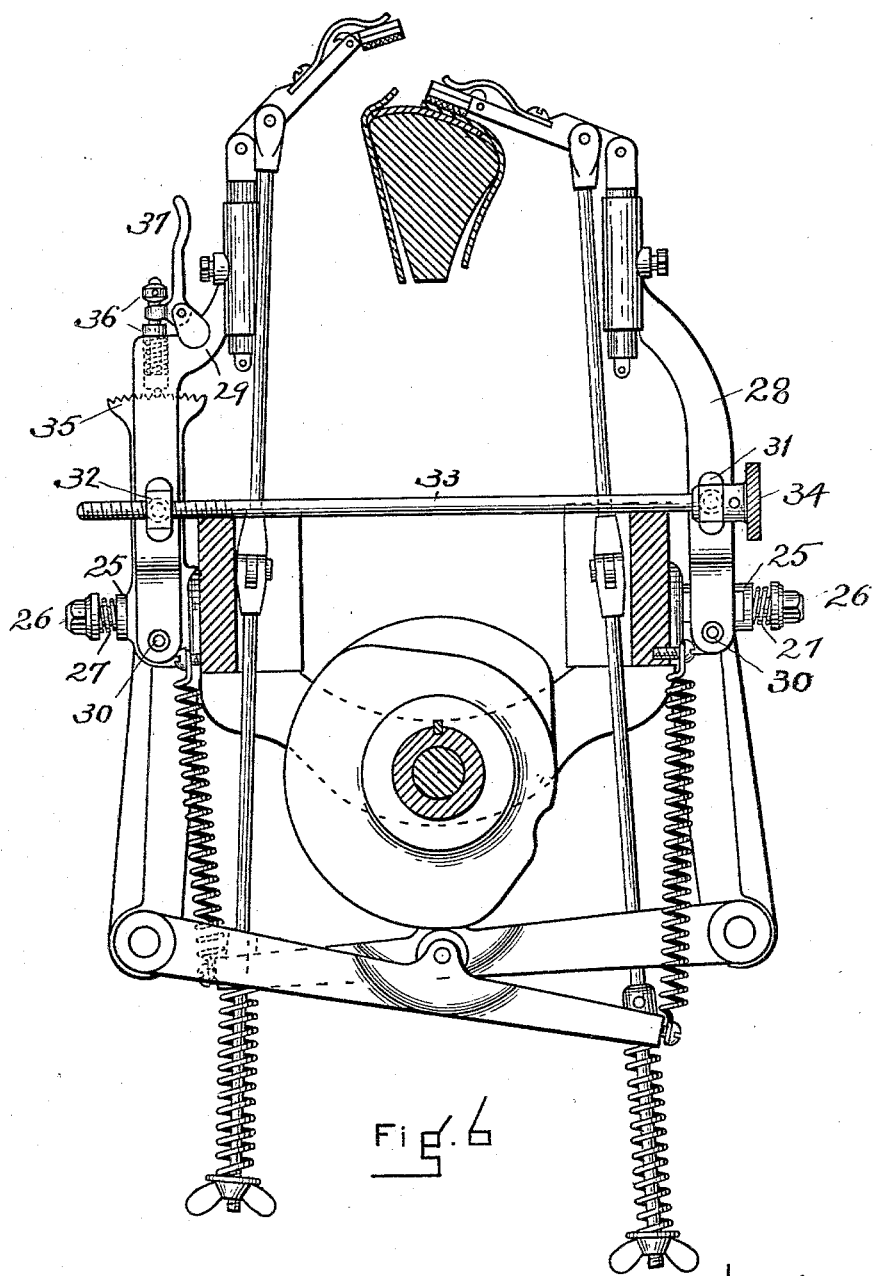

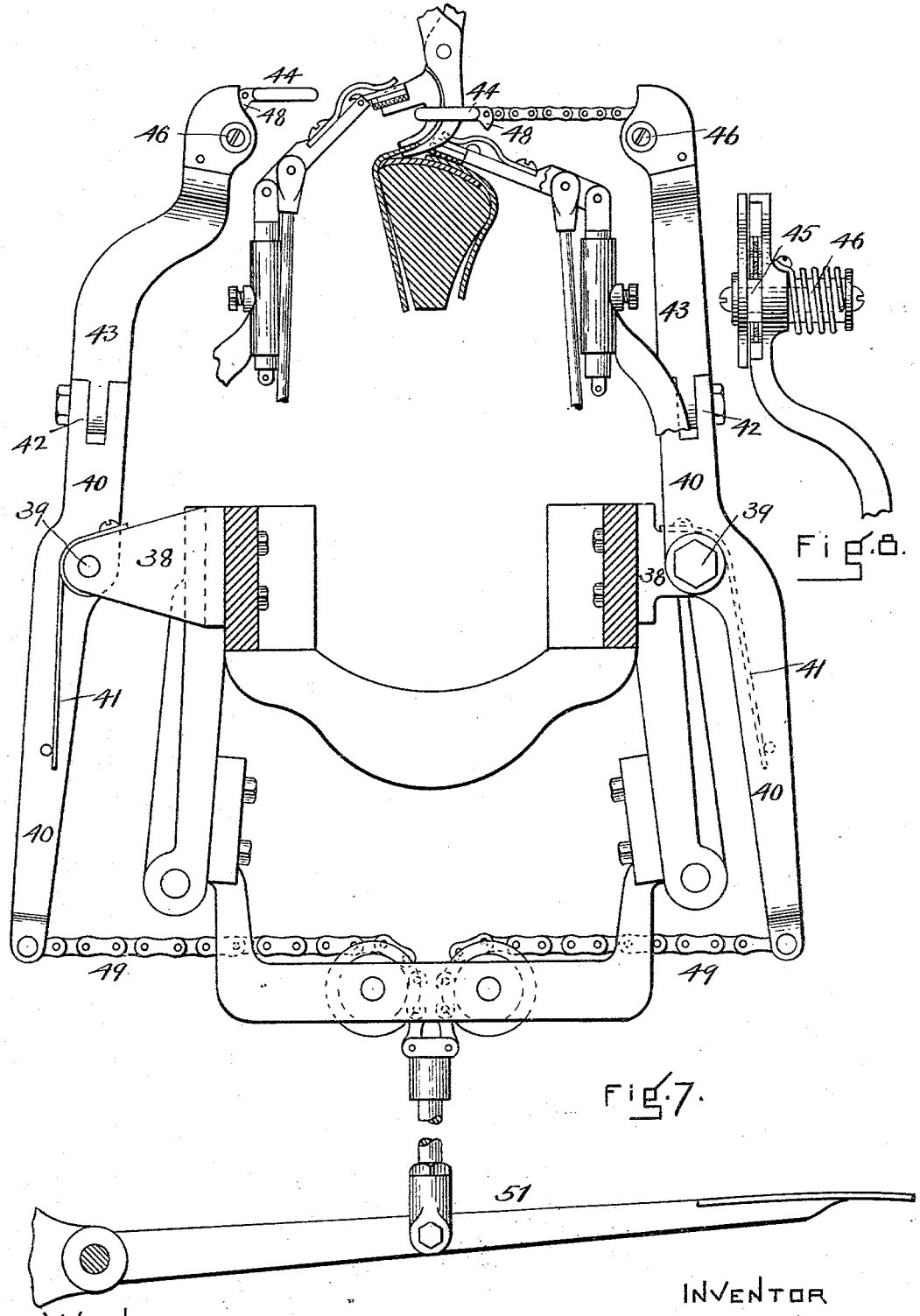

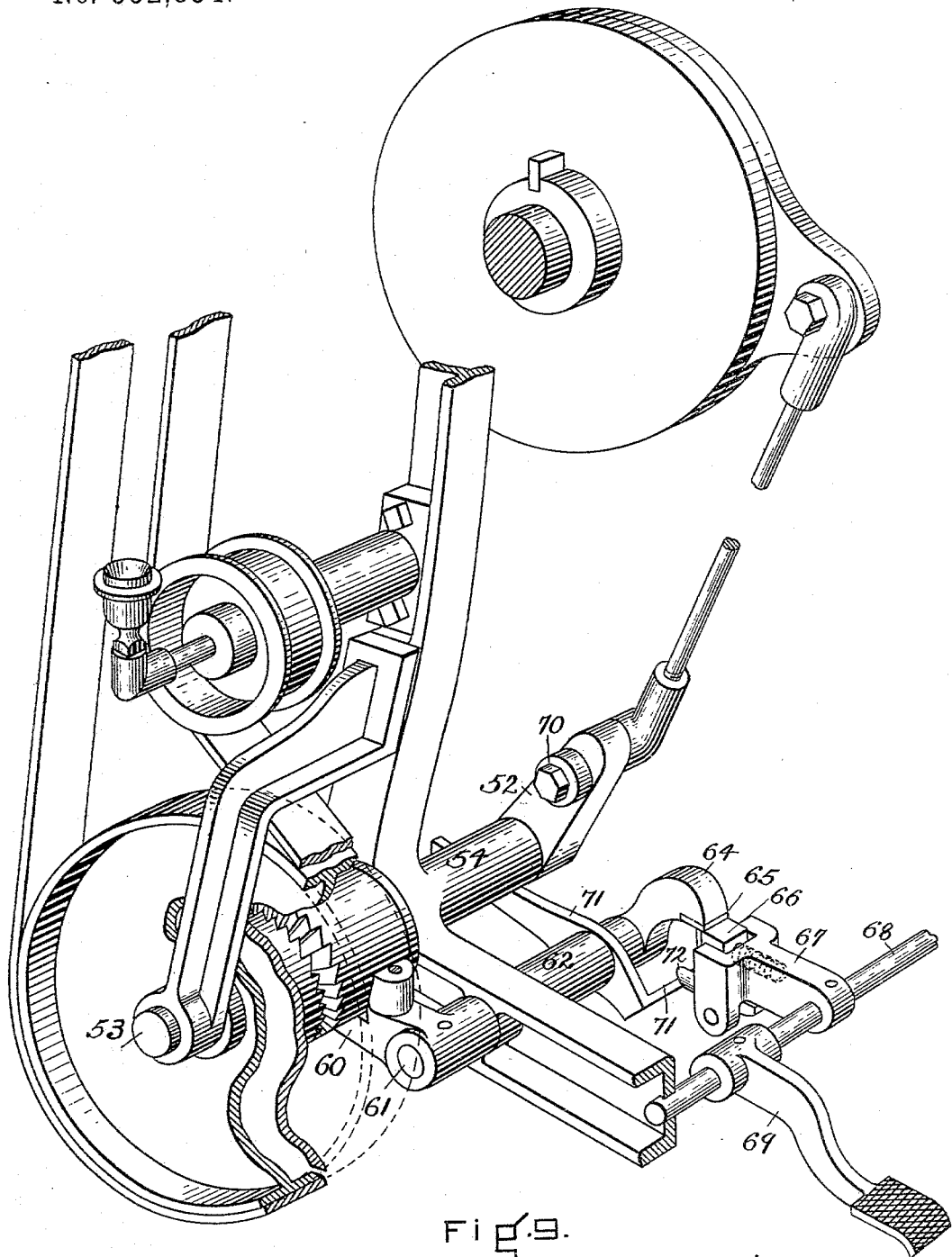

(No Model.) 9 Sheets—Sheet 7.

E. F. GRANDY.
LASTING MACHINE.

No. 552,834. Patented Jan. 7, 1896.

WITNESSES.
Frank G. Parker
Edward S. Day

INVENTOR
Edward F. Grandy

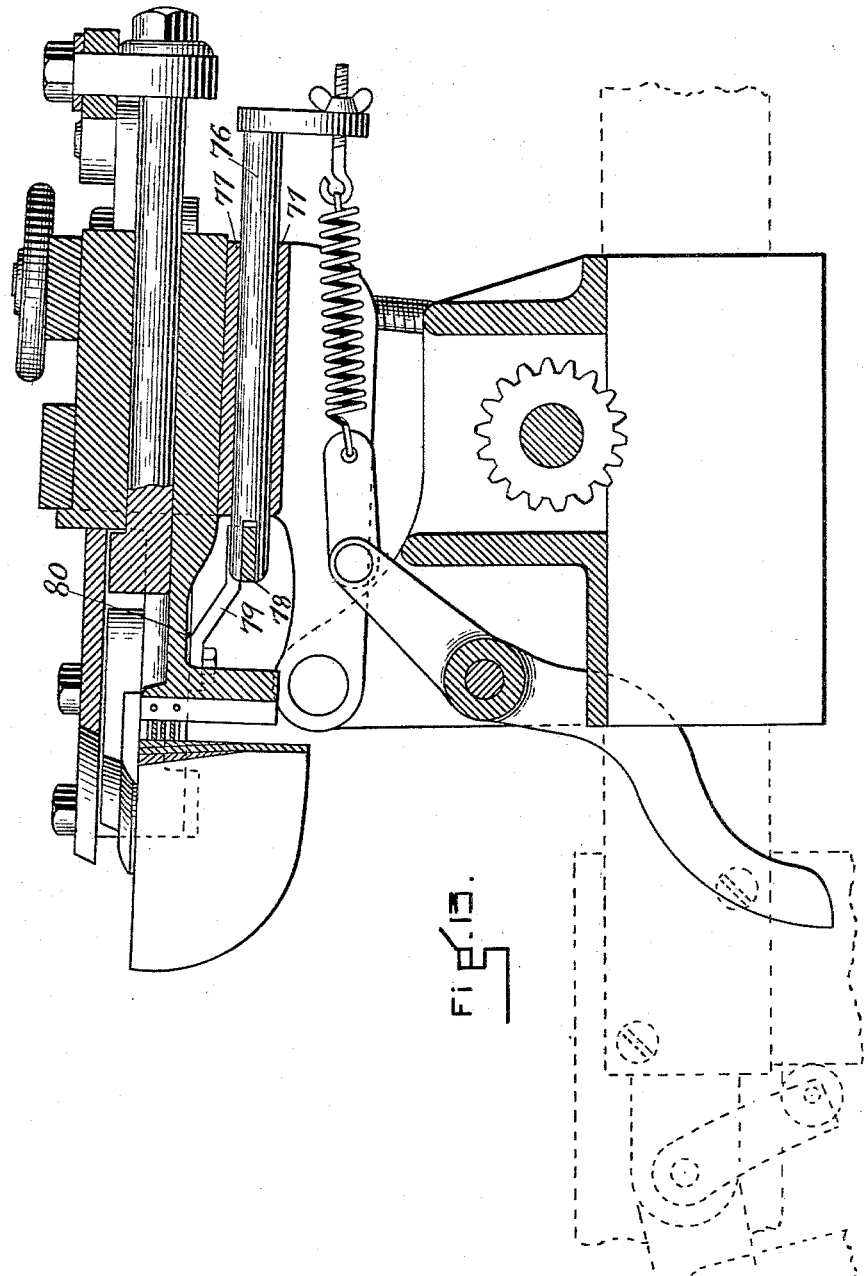

(No Model.)

E. F. GRANDY.
LASTING MACHINE.

No. 552,834.

9 Sheets—Sheet 9.

Patented Jan. 7, 1896.

WITNESSES
Frank G. Parker
Edward S. Day

INVENTOR
Edward F. Grandy

UNITED STATES PATENT OFFICE.

EDWARD F. GRANDY, OF EVERETT, MASSACHUSETTS.

LASTING-MACHINE.

SPECIFICATION forming part of Letters Patent No. 552,834, dated January 7, 1896.

Application filed October 25, 1894. Serial No. 526,915. (No model.)

*To all whom it may concern:*

Be it known that I, EDWARD F. GRANDY, a citizen of the United States, residing at Everett, in the county of Middlesex and State of Massachusetts, have invented certain new and useful Improvements in Lasting-Machines; and I do hereby declare the following to be a full, clear, and exact description of the invention, such as will enable those skilled in the art to which it appertains to make and use the same.

This invention relates to improvements upon the lasting mechanism shown and described in United States Patents No. 521,954, granted to E. F. Grandy, and No. 521,975, granted to J. E. Crisp and E. F. Grandy, June 26, 1894, to which patents reference is hereby made.

This invention specially relates to improved lasting mechanism and the power-actuating mechanism therefor which will be described in detail hereinafter.

Figure 11:
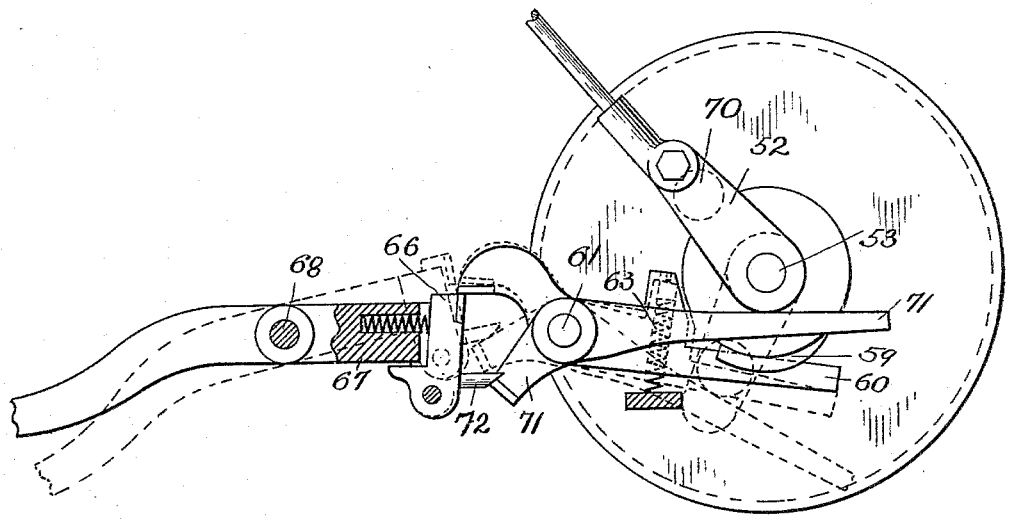
Figure 10:
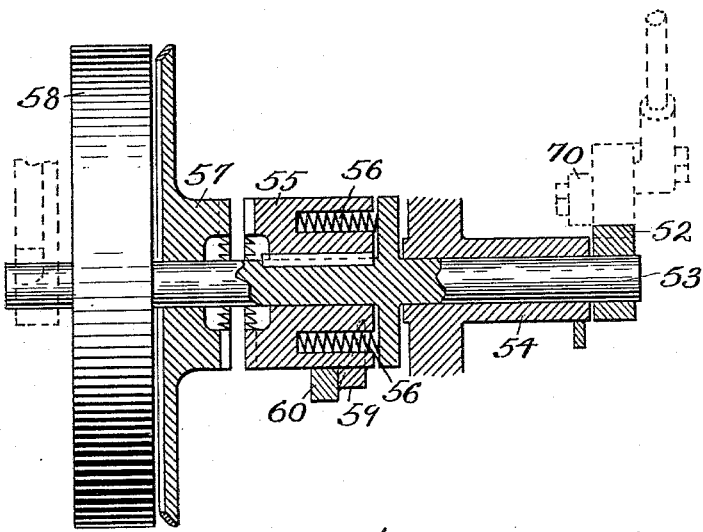
Figure 14:
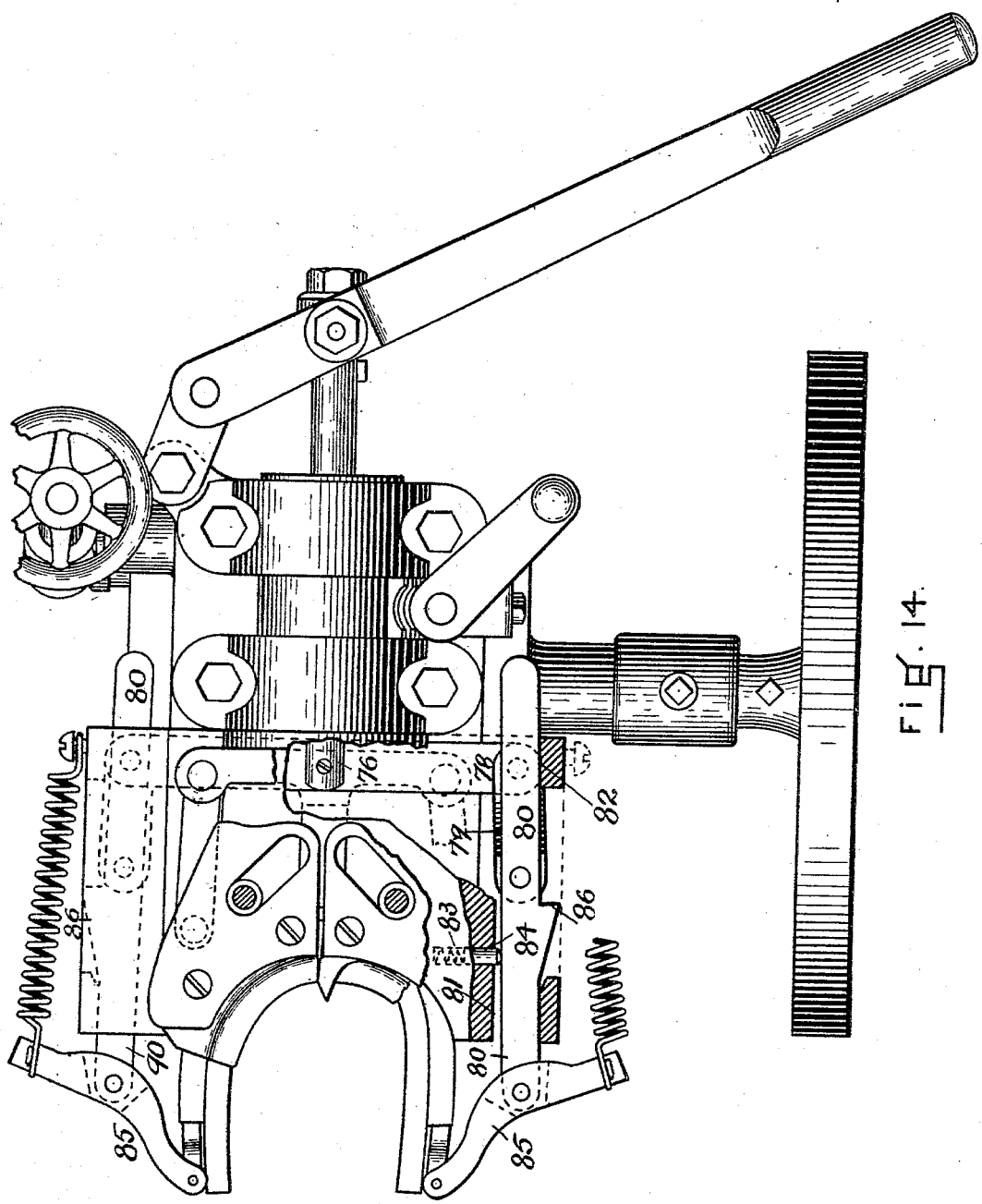

In the drawings, Figure 1 is a plan of an improved lasting-head with upper supporting-plates removed. Fig. 2 is a side elevation of the improved lasting-head mounted upon its supporting-plate. Fig. 3 is a central vertical cross-section of Fig. 2, showing various details of construction. Fig. 4 is a vertical transverse cross-section of Fig. 2, showing the improved mechanism for giving the transverse angular adjustments to the lasting-plates. Fig. 5 is a front elevation of a pair of lasting-plates, showing the improved construction for preserving the continuity of their working edges. Fig. 6 is a transverse vertical section of a portion of the machine, showing the improved mechanism for adjusting simultaneously the side-holding devices to the curvature of right and left lasts. Fig. 7 is a vertical cross-section of a portion of the machine, showing improved mechanism for operating the loops which enable the operator to use the common lasting-pinchers and draw the upper at the shank close to the last. Fig. 8 is a detail of Fig. 7, showing the construction of the upper ends of the loop-carrying arms. Fig. 9 is a perspective view of a portion of the lower part of the machine, showing the power-operating mechanism for moving the cam-shaft. Fig. 10 is a horizontal cross-section of a portion of the power-shaft and parts thereon. Fig. 11 is an inside end view of the power-shaft and starting and stopping mechanism. Fig. 12 is a vertical cross-section of the toe of a last, showing by full and dotted lines the initial and final positions of portions of the toe-lasting mechanism with reference to the toe of the last. Fig. 13 is a vertical cross-section of the heel-lasting head, showing the mechanism for drawing the heel-lasting band. Fig. 14 is a plan of the heel-lasting head, partially in section, showing improved mechanism for equalizing the strains of the heel-lasting band around the last.

The reciprocating slide 1 is constructed and carries the toe-lasting head in the usual manner and provides for the longitudinal adjustment thereof.

The base of the toe-lasting head 2 is pivoted to the slide 1 at 3, and the adjusting-screw 4 at the rear end of the base connects it to the slide 1 and provides for the longitudinal angular adjustment to the toes of the lasts operated upon, Figs. 1 and 2.

In the rear end of the base 2 there is the bearing 5, and fitted to revolve in this bearing is the sleeve 6, having a flat projecting outer end upon which is mounted the toe-lasting mechanism. The segmental worm-gear 7 is fixed to the center of the sleeve 6, and its sides are fitted to a recess formed in the rear part of the base 2, thus holding the sleeve 6 fixed endwise, but free to turn in the bearing 5.

The worm 8 is mounted to turn in bearings 9 and engage with the segment 7, as shown in Fig. 4. As the worm 8 is turned to the right or left, the toe-lasting mechanism is adjusted and fixed in any desired transverse angular position.

The toe-lasting plates 10 are fitted to move upon the surface of the projecting end of the sleeve 6, so that their working surfaces are parallel with the center of the sleeve, as shown in Fig. 3. These plates are of the usual construction, and the guide-rolls which govern their motions are held in position by the bolts 11, which hold the top plate 12 in place.

The front ends of the links 24, Fig. 1, are pivoted to the lasting-plates 10, close to their removable working edges, and the rear ends of these links are pivoted to the cross-bar 13, which is fixed on the stem 14, which is fitted to reciprocate in the sleeve 5, as shown by Figs. 3 and 4.

The collar 15 is secured on the rear end of the stem 14 by the nut and washer 16 17, so that the stem can turn within the collar, and the collar is provided with the stem 18, which is connected to the hand-lever 19 in the same manner, the whole thus forming a universal joint connecting the stem 14 and hand-lever 19. The hand-lever 19 is fulcrumed to the swinging link 20, Fig. 1, which is pivoted to the base 2 at 21. When the hand-lever is operated, it, by means of the above-described connections, opens and closes the lasting-plates without its movements being affected by their angular position.

After the lasting-plates have been operated to turn and fold down the edges of the upper upon the inner sole they are partially drawn back to allow the holding-tacks to be driven around the toe of the last. Driving the tack requires the operator to use both hands, and the vibration given the last causes the lasting-plates to move back and release the edges of the upper in whole or in part.

To hold the lasting-plates in any desired forward position the spring-catch 22 is pivoted to the hand-lever 19, and the segmental ratchet-rack 23 is secured to the base 2 to engage with the catch 22 (shown by Figs. 1 and 2) and prevent any backward movement of the lasting-plates when not desired.

The lasting-plates are constructed as described in the patents referred to, and consist of fixed guiding parts, in which are formed the guide-slots, and which are attached to the operating mechanism, and removable parts which are shaped to the style of toes to be operated upon, and which present a substantially unbroken edge to the toe of the upper.

Heretofore the contacting sides and corners of the removable parts of the folding plates have been abutted together. In the process of lasting as practiced upon the class of machines of which these plates form a part the working edges of the plates commence to act upon the surface of the upper some distance from the inner sole and mold the upper around the toe of the last before they commence to turn and fold it down upon the inner sole. The wear of the cam-slots, pins and rolls in the guiding parts in time causes the abutting corners of the folding plates to lose touch with each other during the molding process. This leaves the median line of the toe of the upper unacted upon, leaving a line which, though slight, requires removing in the best grades of work. To prevent the necessity of after manipulation of the toe of the upper the contacting edges of the removable parts of the lasting-plates are rabbeted together slightly, as shown in Figs. 1 and 5, which prevents the fault caused by the wear of the operating parts and preserves the continuity of their working edges. In Patent No. 521,954 there has been shown and described side-holding clamps and adjusting mechanism to swing said clamps in unison crosswise the machine to operate upon the rights and lefts of narrow shank-lasts.

To cause the side-holding clamps to operate to the best advantage upon all lasts, it is requisite that the side-holding clamps be also adjusted with reference to each other and that they can be readily moved from one position to the other.

Fig. 6 shows the improved mechanism for attaining these results, which is constructed and operates as follows: The hubs 25 are mounted upon the bolts 26, fixed in the parallel ties forming the frame of the machine. These hubs turn lengthwise of the machine, and interposed between the outer faces of the hubs and the heads of the bolts are the strong spiral springs 27, which act as a friction device to hold the hubs and the parts mounted thereon in any set position lengthwise. The standards 28 29 are pivoted to the hubs 25 at 30, which allows the standards and their attachments to swing crosswise of the machine. The collar 31, having a projecting stem, is mounted to turn on the front standard 28, and the nut 32 is similarly mounted on the rear standard 29. The cross shaft or rod 33 is fitted to turn in the collar 31, and is provided with a thumb-nut 34, and the other end of the shaft 33 is fitted to the nut 32. As the thumb-nut 34 is turned, the holding-clamps mounted on the upper free ends of the standards are moved toward or from each other. Attached to and projecting above the rear hub 25 is the segmental rack 35, whose teeth are made V-shaped to hold in either direction, and mounted on the rear standard 29, so that it will engage with the segmental rack 35, is the spring-catch 36, which can be withdrawn clear of the rack by the handle 37 pivoted on the standard above it.

In Patent No. 521,975 there has been shown and described mechanism which enables the operator to use the common lasting-pinchers and draw the upper at the shank close to the last by operating a foot-lever. Figs. 7 and 8 show an improved construction for the same purpose, which is constructed and operated as follows: Formed upon or secured to the parallel ties E are the projecting ears 38 38, to which at 39 39 there are pivoted the swinging levers 40 40, whose upper ends the springs 41 41 press toward the center of the machine when allowed to do so. Pivoted to the upper ends of the levers 40 40 at 42 42 so that they will swing lengthwise of the machine are the extensions 43 43, whose upper ends carry the pincher-receiving loops 44 44. The loops 44 44 are attached to the free end of a short length of chain, as shown to the right of Fig. 7, whose inner end is secured to the rolls 45, which rolls are fixed upon a short shaft 46, which bears and turns in the upper ends of the extensions 43 43, as shown by Fig. 8. To the projecting ends of the shafts 46 there is secured the torsional springs 47 47, which act to wind the chains around the rolls 45 45 and draw suitable stops 48 48, formed upon the loops 44 44, close to the extensions 43 43 and hold the loops horizontal for the reception of the nose of the pinchers, as shown to the left of Fig. 7. The height of the rolls 45 45 is such with reference to the surface of the bottom of the last at the shank that (when the loops are drawn out and the pinchers are attached to the upper) their line of action is substantially parallel thereto, as shown to the right of Fig. 7. To the lower ends of the levers 40 40 there is connected the chains 49 49, which lead over the guide-rolls 50 50 and are connected to a common operating-treadle 51.

The power-operating mechanism illustrated in Figs. 9, 10, and 11 of the drawings is simpler in construction and more positive in operation than that shown and described in Patent No. 521,975, and it is constructed and operates as follows:

In Patent No. 921,954 the cam-shaft is revolved by ratchet and pawl, which is moved by a foot-treadle and connecting-rod. In the present instance the crank 52 is attached to the connecting-rod and is made of such length that each revolution of the crank will move the ratchet one tooth. The crank 52 is fixed upon the shaft 53, and the shaft is mounted to revolve in the bearing 54, formed upon or attached to the lower part of the frame of the machine, as shown by Fig. 11.

Outside of the frame of the machine the clutch 55 is fitted to slide upon the shaft, and the springs 56 act to press it toward its counterpart, when permitted to do so. The counterpart of the clutch 57 and the belt-pulley 58 are fixed together so that they will form a groove for the belt which operates the tack-elevating mechanism, and so that they will revolve in unison upon the shaft 53, and when the springs 56 connect the two parts of the clutch the crank 52 will revolve.

To separate the two parts of the clutch after each revolution, the inclined cam 59 is formed upon or secured to the sliding part of the clutch 55, so that it will engage with the inclined end of the swinging lever 60, when said lever is in position to do so. The swinging-lever 60 is fixed to one end of the shaft 61, and the shaft 61 is mounted to oscillate in the bearing 62, as shown by Fig. 9, and the spring 63, Fig. 11, acts to press the free end of the lever 60 toward the clutch 55 and engage with the incline 59 and stop the revolution of the crank-shaft by drawing back the clutch 55.

To the inner end of the shaft 61 there is fixed the lever 64, Figs. 9 and 11, whose outer end is provided with the catch 65, which the swinging dog 66 will engage with at the proper times. The swinging dog 66 is hung upon the lever 67, which is fixed upon the treadle-shaft 68, which has also fixed upon it the treadle 69, and is mounted to oscillate in bearings formed upon the frame of the machine, a spring (not shown) acting to raise the foot-piece. When the foot-piece of the treadle 69 is fully depressed from its elevated position, the inclined end of the lever 60 is swung clear of the cam 59, and the springs 56 connect the two members of the clutch so that the crank will revolve, while at the same time the points of the catch 65 and the dog 66 move past each other and allow the spring 63 to swing the lever 60 toward the clutch 57 and draw it back when the crank has made its full revolution. This start-and-stop mechanism, so far as described, is substantially the same as that of the patent hereinbefore mentioned, and in case the operator fails to fully depress the starting-treadle by accident or design, and not draw the points of the catch 65 and the dog 66 clear of each other, the crank might make more than one revolution and cause the power-operated parts of the machine to get in advance of the times desired or advantageous.

To insure the full depression of the foot-piece the roll 70 is mounted on the back side of the crank 52, as shown by Figs. 9 and 11, so that it will engage with the inner end of the lever 71 and depress it during the revolution of the crank. The lever 71 is hung upon the oscillating shaft 61 between the bearing and the lever 62, so that it is free to swing within certain limits, and its outer end is shaped to pass under and engage with the pin 72, fixed in the dog 66, and as shown by the full and dotted lines of Fig. 11, each time the crank revolves the foot-piece is fully depressed, and the swinging lever 60 is free to swing and engage with the inclined cam 59, and thus separate the two parts of the clutch and stop the machine.

Figs. 1, 2, and 12 show the construction, position, and operation of an improved device which assists the toe-lasting plates in forming and holding the upper around the sides of the toe of the last. This device consists of the presser-feet 73 73, which are pivoted to the inner of the sliding bars 74 74, so that they will swing loose to and parallel with the under surface of the toe-lasting plates, as shown by Figs. 1 and 12. The sliding bars 74 74 are fitted to slide in the under part of the toe-lasting head at right angles to the median line of the machine, and the springs 75 75, also fixed in or secured to said head, act to press them and the presser-feet toward the median line with the desired strength. The surfaces of the presser-feet 73 73 which contact with the upper are concaved to the average curve of the sides of the toe of the lasts to be operated upon, and their edges are rounded so that they will move over the upper without injury thereto when the toe-lasting head is given vertical motion. The horizontal movement of the slide-bars 74 74 is made sufficient to allow the working faces of the presser-feet to engage with the largest and smallest toe of the series to be operated upon correctly.

In the lasting operation after the toe of the last has been placed upon the toe-rest the toe-lasting head and its attachments are moved toward it until the working edges of the open toe-lasting plates contact with the toe of the upper at the desired distance below the inner sole. By this movement of the toe-lasting head the working surfaces of the presser-feet 73 73 are brought into elastic contact with the sides of the toe of the upper below the line of contact of the edges of the toe-lasting plates, as shown by the full lines of Fig. 12, where they act to press the upper close to the last.

When the toe-lasting plates are moved vertically to the position shown by the dotted lines of Fig. 12, the presser-feet have acted to draw the upper close to the last, and when they have reached their highest point they act to hold the upper close to the edges of the toe of the last while the toe-lasting plates fold the edges of the upper down upon the inner sole. This last function of the presser-feet is of special value if the parallelism of the under surface of the lasting-plates and the surface of the inner sole is not correct, as it insures a perfect corner for the upper at each side of the toe. These presser-feet also materially aid positioning the toe of the last centrally with the line of action of the toe-lasting plates.

In the patents hereinbefore referred to the heel-supporting band is shown and described as having its outer ends mounted upon the inner ends of bell-crank levers, which are hung upon reciprocating slide-bars, which slide-bars move in parallel guideways formed in the under side of the heel-lasting head and have the power connection attached to their rear ends.

By the above-described arrangement of parts the movements of the heel-band were substantially positive—that is, its movements were the same no matter what the size or shape of the heel presented to it. For instance, if the heel-band was mounted to act equally upon a heel of middle size and one of the largest size was presented to it the pressure exerted would be the strongest in the center of the heel and weakest at the ends of the band, and on the smallest heel the reverse would take place. This is caused by the bell-crank levers assuming different angles with reference to the slide-bars which carry and actuate them. This action of the heel-band slightly affects the holding of the counter of the upper close to the last before the lasting-plates commence their action, and the result is not the best which can be attained.

Figs. 13 and 14 show mechanism which automatically adjusts the pressures of the heel-band so that it will press equally around heels of varying counters, no matter in what order they may be presented to it. This improvement is shown mounted upon a heel-lasting head, which is substantially the same in construction and operation as the toe-lasting head shown and described in this application, the operating parts up to the slide-rod 76 being the same as those of the previous patents. The slide-rod 76 is fitted to a suitable bearing 77, which is formed in the under part of the heel-lasting head so that it will reciprocate therein, as will be understood from Fig. 13, and to the inner end of this slide-rod there is pivoted the cross-bar 78, so that it will reciprocate therewith.

To the outer ends of the cross-bar there is pivoted the swinging links 79, which in turn are pivoted to the sliding bars 80, so that they will communicate the motion given to the slide-rod 76 to the slide-bars 80. The slide-bars 80 are fitted to slide in the heel-lasting head so that their forward ends will move in the groove 81 and their rear ends will engage with the rib 82, as shown by Fig. 14, the groove 81 being so formed as to allow the forward ends of the bars 80 some lateral movement, and the spring 83, acting against the presser 84, holds the slide-bars 80 against the outer sides of the grooves 81.

To the outer ends of the slide-bars 80 the bell-crank levers 85 are pivoted in the usual manner, and as the slide-rod 76 is reciprocated the heel-band opens and closes.

To automatically adjust the heel-band to varying sizes of heels so its pressure will be the same at all times there is formed upon the slide-bars 80 the inclines 86, which engage with the outer sides of the grooves 81 and move the forward ends of the slide-bars 80 inward against the springs 83 in the correct ratio to the forward movement of the slide-bars. This causes the bell-crank levers 85 to maintain the same relative angle to the slide-bars 80 and thus exert the same inward strain upon the ends of the heel-lasting band at all forward positions of the slide-bars.

The advantages of the within-described improvements are obvious.

The toe-lasting head is rigidly mounted to oscillate for transverse angular adjustments in the simplest possible manner, and the worm and segment give and rigidly maintain the most minute adjustments.

Power is applied to the lasting-plates in the most advantageous manner to prevent undue strain upon the cam-slots, pins and rolls.

The rabbeted edges of the lasting-plates insure the perfection of molding the toes of the upper around the toes of the last.

The operator can perform the tacking operation without care as to the position of the toe-lasting plates.

The holding-clamps can be adjusted to any desired width of last, and the adjustments to the shanks of right and left lasts can be made with great rapidity.

The toe of the upper is molded closer around the toe of the last, and the absolute adjustment of the lasting-plates transversely is no longer a necessity.

The counters are more equally drawn around the heel of the last, and thus add to the finish of the edge of the heel-seat.

The action of the power-moved parts of the machine is absolutely certain without care on the part of the operator, and the chance of injury to either work or operator is entirely obviated.

Having thus described my invention, what I claim, and desire to secure by Letters Patent of the United States, is—

1. In a lasting machine head the combination of a base longitudinally pivoted, and adjustable, a sleeve supporting toe lasting mechanism mounted to revolve transversely thereon, lasting mechanism centrally mounted upon said sleeve, and worm and gear mechanism to revolve and hold said sleeve substantially as shown and described.

2. In a lasting machine head, the combination of a base longitudinally pivoted and adjustable, a sleeve supporting toe lasting mechanism mounted to revolve transversely thereon, lasting mechanism centrally mounted upon said sleeve, a stem connected to the lasting plates passing through said sleeve, and an operating lever connected to said base by a swinging link, and to said stem by a universal joint, substantially as shown and described.

3. In a lasting machine head, the combination of a base longitudinally pivoted and adjustable, a sleeve supporting toe lasting mechanism mounted to revolve transversely thereon, lasting mechanism centrally mounted upon said sleeve, a stem connected to the lasting plates passing through said sleeve, an operating lever connected to said stem substantially as described, and ratchet and pawl mechanism to insure the set position of said plates, substantially as shown and described.

4. In a lasting machine, removable turning and folding plates, having curved and rounded working edges and straight rabbeted median edges, substantially as and for the purpose set forth.

5. In a lasting machine the combination of hubs mounted on the frame of the machine to turn lengthwise thereof, a spring friction device to restrain the free movement of said hubs, and standards supporting side lasting mechanism pivoted to swing on said hubs at right angles to the motion thereof, substantially as shown and described.

6. In a lasting machine the combination of hubs mounted to turn lengthwise of the machine, standards supporting side lasting mechanism pivoted to swing on said hubs at right angles thereto, screw and nut mechanism pivoted to opposing pairs of said standards for connecting, adjusting and holding them with reference to each other, and rack and catch mechanism for adjusting and holding said pairs with reference to the median line of the machine, substantially as shown and described.

7. In a lasting machine, the combination with the heel supporting band thereof, of supporting and operating slide bars bell crank levers mounted thereon carrying the heel supporting band substantially as described, inclines on said slide bars which act against the outer sides of the guide grooves and maintain the angular position of said bell crank levers for the different variations of shape and size of heel, substantially as shown and described.

EDWARD F. GRANDY.

Witnesses:
 JOS. E. CRISP,
 ALICE M. VINTON.